US009483703B2

(12) United States Patent
Medioni et al.

(10) Patent No.: US 9,483,703 B2
(45) Date of Patent: Nov. 1, 2016

(54) ONLINE COUPLED CAMERA POSE ESTIMATION AND DENSE RECONSTRUCTION FROM VIDEO

(71) Applicants: Gerard Medioni, Los Angeles, CA (US); Zhuoliang Kang, Los Angeles, CA (US)

(72) Inventors: Gerard Medioni, Los Angeles, CA (US); Zhuoliang Kang, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 196 days.

(21) Appl. No.: 14/120,370

(22) Filed: May 14, 2014

(65) Prior Publication Data
US 2014/0340489 A1    Nov. 20, 2014

Related U.S. Application Data

(60) Provisional application No. 61/823,299, filed on May 14, 2013.

(51) Int. Cl.
*H04N 13/02* (2006.01)
*G06K 9/46* (2006.01)
(Continued)

(52) U.S. Cl.
CPC .............. *G06K 9/46* (2013.01); *G06K 9/00201* (2013.01); *G06K 9/00637* (2013.01);
(Continued)

(58) Field of Classification Search
CPC .............. G06K 9/46; G06K 9/00201; G06K 9/00637; G06T 7/0046; G06T 7/0071; G06T 2207/10032; G06T 2207/30184
USPC .......................................................... 348/50
See application file for complete search history.

(56) References Cited

U.S. PATENT DOCUMENTS

| 4,768,034 A * | 8/1988 | Preikschat ............ G01S 13/726 342/156 |
| 2004/0247174 A1* | 12/2004 | Lyons ................. G06F 3/04845 382/154 |

(Continued)

OTHER PUBLICATIONS

123D Catch, Autodesk. web site: http://www.123dapp.com/catch. 2014. (Snapshot of website dated May 13, 2014 downloaded from https://web.archive.org/web/20140513070332/http://www.123dapp.com/catch).

(Continued)

*Primary Examiner* — William Tran
(74) *Attorney, Agent, or Firm* — McDermott Will & Emery LLP

(57) ABSTRACT

A product may receive each image in a stream of video image of a scene, and before processing the next image, generate information indicative of the position and orientation of an image capture device that captured the image at the time of capturing the image. The product may do so by identifying distinguishable image feature points in the image; determining a coordinate for each identified image feature point; and for each identified image feature point, attempting to identify one or more distinguishable model feature points in a three dimensional (3D) model of at least a portion of the scene that appears likely to correspond to the identified image feature point. Thereafter, the product may find each of the following that, in combination, produce a consistent projection transformation of the 3D model onto the image: a subset of the identified image feature points for which one or more corresponding model feature points were identified; and, for each image feature point that has multiple likely corresponding model feature points, one of the corresponding model feature points.
The product may update a 3D model of at least a portion of the scene following the receipt of each video image and before processing the next video image base on the generated information indicative of the position and orientation of the image capture device at the time of capturing the received image. The product may display the updated 3D model after each update to the model.

10 Claims, 10 Drawing Sheets

(51) Int. Cl.
G06T 7/00 (2006.01)
G06K 9/00 (2006.01)
(52) U.S. Cl.
CPC .......... *G06T 7/0046* (2013.01); *G06T 7/0071* (2013.01); *G06T 2207/10032* (2013.01); *G06T 2207/30184* (2013.01)

(56) References Cited

U.S. PATENT DOCUMENTS

| | | | | |
|---|---|---|---|---|
| 2006/0120625 | A1* | 6/2006 | Peleg | G06T 3/4038 382/284 |
| 2008/0050011 | A1* | 2/2008 | Ofek | G06T 17/05 382/154 |
| 2009/0010507 | A1* | 1/2009 | Geng | G06T 7/0075 382/128 |
| 2010/0033484 | A1* | 2/2010 | Kim | G06T 19/006 345/426 |
| 2010/0232727 | A1* | 9/2010 | Engedal | G06T 7/0046 382/285 |
| 2011/0235897 | A1* | 9/2011 | Watanabe | G06K 9/00214 382/154 |
| 2012/0147004 | A1* | 6/2012 | Choi | G06T 15/04 345/420 |
| 2013/0335635 | A1* | 12/2013 | Ghanem | G01S 3/7865 348/659 |
| 2014/0300637 | A1* | 10/2014 | Fan | G06T 7/0046 345/634 |

OTHER PUBLICATIONS

Hartley, R. et al. 2000. Multiple View Geometry in Computer Vision. Cambridge University Press, Jun. 2000. ISBN 0521623049. Part II, Chapter 8: Epipolar Geometry and the Fundamental Matrix, pp. 219-243.

Newcombe, R.A. et al. 2010. Live Dense Reconstruction with a Single Moving Camera. In Proceedings of the Computer Vision and Pattern Recognition (CVPR), 2010 IEEE Conference on, Jun. 13-18, 2010, 8 pages.

Newcombe, R.A. et al. 2011. DTAM: Dense Tracking and Mapping in Real Time. In Proceedings of the 13th International Conference on Computer Vision (ICCV), Nov. 6-13, 2011, Barcelona, Spain, 8 pages.

Pix4D web site: https://pix4D.com/. 2014. (Snapshot of website dated Feb. 8, 2014 downloaded from https://web.archive.org/web/20140208053154/http://pix4d.com/).

Photosynth web site: http://photosynth.net. 2014 (Snapshot of website dated Apr. 15, 2014 downloaded from https://web.archive.org/web/20140415035842/http://photosynth.net/).

Tanskanen, P. et al. 2013. Live Metric 3D Reconstruction on Mobile Phones. In Proceedings of the 15th International Conference on Computer Vision (ICCV), Dec. 3-6, 2013, Sydney, Australia, 8 pages.

Agarwal, S. et al. 2011. Building Rome in a Day. Communications of the ACM, 54(10): pp. 105-112, Oct. 2011.

Kang, Z. et al. 2014. Fast Dense 3D Reconstruction using an Adaptive Multiscale Discrete-Continuous Variational Method. Conference on Applications of Computer Vision (WACV), pp. 53-60.

Klein, G. et al. 2007. Parallel Tracking and Mapping for Small AR Workspaces. In Proceedings of the 2007 6th IEEE International Symposium on Mixed and Augmented Reality (ISMAR '07), pp. 225-234.

Klein, G. et al. 2009. Parallel Tracking and Mapping on a Camera Phone. In Proceedings of the 2009 8th IEEE International Symposium on Mixed and Augmented Reality (ISMAR '09), Oct. 19-22, 2009, pp. 83-86.

Triggs, B. et al. 2000. Bundle Adjustment—A Modern Synthesis. Vision Algorithms: Theory and Practice, International Workshop on Vision Algorithms, Sep. 21-22, 1999, pp. 153-177.

Wu, C. 2013. Towards Linear-Time Incremental Structure from Motion. In Proceedings of the 2013 International Conference on 3D Vision (3DV '13), pp. 127-134.

\* cited by examiner

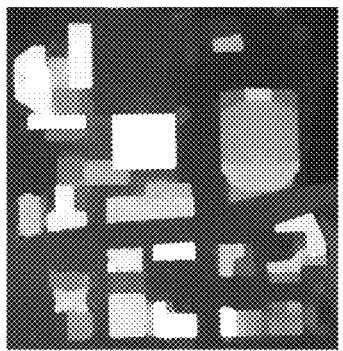 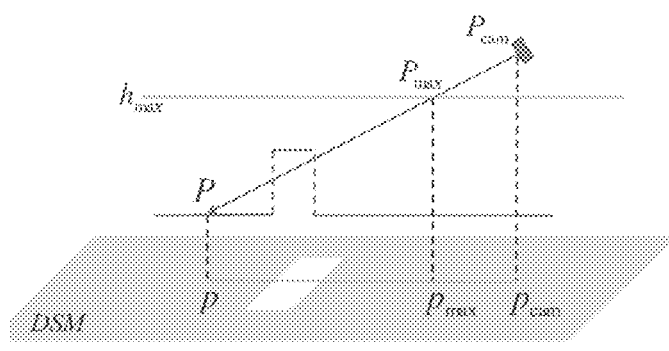
FIG .8A                    FIG .8B

ONLINE COUPLED CAMERA POSE ESTIMATION AND DENSE RECONSTRUCTION FROM VIDEO

CROSS-REFERENCE TO RELATED APPLICATION

This application is based upon and claims priority to U.S. provisional patent application 61/823,299, entitled "Online Coupled Camera Pose Estimation and Dense Reconstruction for Urban Modeling," filed May 14, 2013. The entire content of this application is incorporated herein by reference.

STATEMENT REGARDING FEDERALLY SPONSORED RESEARCH

This invention was made with government support under Grant No. DE-FG52-08NA28775, awarded by the Department of Energy. The government has certain rights in the invention.

BACKGROUND

1. Technical Field

This disclosure relates to camera pose estimation and dense reconstruction from a video.

2. Description of Related Art

In computer vision, Structure-from-Motion (SFM) approaches may be used to infer camera poses (positions and orientations) from 2D images. See Richard Hartley and Andrew Zisserman, "*Multiple view geometry in computer vision*", volume 2. Cambridge Univ. Press, 2000.

This problem may be solved using offline SFM approaches. See Sameer Agarwal, Yasutaka Furukawa, Noah Snavely, Ian Simon, Brian Curless, Steven M Seitz, and Richard Szeliski, "*Building rome in a day*", Communications of the ACM, 54(10):105-112, 2011, and Changchang Wu, "*Towards linear-time incremental structure from motion*", In 3DV, 2013. However, these approaches may be very time-consuming. Offline SFM approaches may infer the camera position and orientation for each image using pairwise 2D-2D image point correspondences after collecting all images. The camera positions and orientations may be refined with Bundle Adjustment operation. See Bill Triggs, Philip McLauchlan, Richard Hartley, and Andrew Fitzgibbon, "*Bundle adjustment—a modern synthesis*", Vision algorithms: theory and practice, pages 153-177, 2000). But this may also be computationally heavy.

Online SFM approaches may operate sequentially from a video stream and infer camera position and orientation for each provided image sequentially before later images arrive. However, these online SFM approaches may be inaccurate with large errors in the estimated camera pose and orientation due to errors accumulated along the process. See Georg Klein and David Murray "*Parallel tracking and mapping for smaller workspaces*", In ISMAR, 2007; Georg Klein and David Murray, "*Parallel tracking and mapping on a camera phone*", In ISMAR, 2009.

SUMMARY

A product may include a processing system containing at least one processor or a non-transitory, tangible, computer-readable storage medium containing a program of instructions that control a computer system running the program of instructions.

The product may receive a stream of video images of a scene. Each image may have been captured by an image capture device while located at a particular position and having a particular orientation. At least two of the images may have been captured by the image capture device while at different locations.

After receiving each image and before processing the next image, the product may generate information indicative of the position and orientation of the image capture device at the time of capturing each image. The product may do so by identifying distinguishable image feature points in the image; determining a coordinate for each identified image feature point; and for each identified image feature point, attempting to identify one or more distinguishable model feature points in a three dimensional (3D) model of at least a portion of the scene that appears likely to correspond to the identified image feature point. Thereafter, the product may find each of the following that, in combination, produce a consistent projection transformation of the 3D model onto the image: a subset of the identified image feature points for which one or more corresponding model feature points were identified; and, for each image feature point that has multiple likely corresponding model feature points, one of the corresponding model feature points.

The product may use information from one or more inertial sensors to do the finding.

The product may update the 3D model after generating the information indicative of the position and orientation of the image capture device for each image based on that generated information.

The product may display the updated 3D model after each update to the model.

The product may use information from one or more inertial sensors to do the update step.

The product may identify a virtual ground plane of the scene and estimate an orientation of a normal to the virtual ground plane and a position of the virtual ground plane.

The product may produce a 2.5-dimensional digital surface model (DSM) that includes information indicative of the altitude of components in the DSM above the virtual ground plane.

The product may rectify images regarding the virtual ground plane to filter out parallax from camera motion and computes optical flow between rectified images.

The product may infer dense three dimensional (3D) geometric information about the scene based on at least a portion of the stream of video images and the information indicative of the position and orientation of the image capture device at the time of capturing at least two of the received video images.

The product may identify a virtual ground plane of the scene and estimate an orientation of a normal to the virtual ground plane and a position of the virtual ground plane. The product may infer the dense 3D geometric information by estimating a height map of values that represent altitudes above the virtual ground plane.

The product may produce a dense 3D model of the scene based on the dense 3D geometric information.

The product may produce a 2.5-dimensional digital surface model (DSM) that includes information indicative of the altitude of components in the DSM above the virtual ground plane. The product may produce a dense 3D polygon model based on the dense 3D geometric information using a volumetric reconstruction method with the volume size being based on the 2.5-dimensional digital surface model.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 8A illustrates an example of an incrementally updated 2.5D digital surface model, and FIG. 8B illustrates an example of and occlusion handling based on this 2.5D digital surface model.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Algorithm Overview

Figure 1:
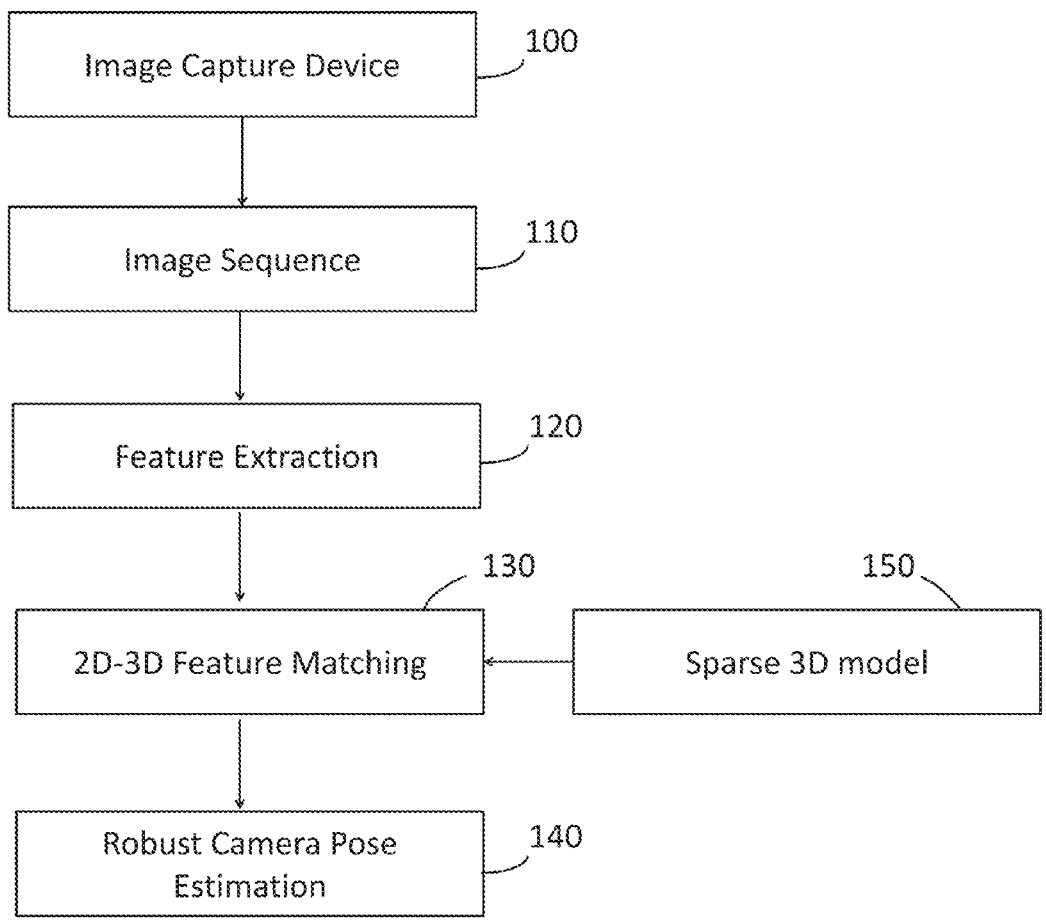
FIG. 1 is a flowchart illustrating an example of an online camera pose estimation algorithm.

FIG. 1 is a flowchart illustrating an example of an online camera pose estimation algorithm. The input may be a video stream captured from a single moving image capture device, as indicated at 100. The image capture device may be a video camera in an airborne vehicle or may be a hand-held device, such as a smartphone with a built in camera. The video stream may be in the form of an ordered image sequence.

As indicated at 110, images may arrive sequentially from the video stream.

As indicated at 120, a feature extraction technic may extract distinguishable 2D image features from the image.

As indicated at 130, a 2D-3D feature matching technic may find candidate feature correspondences between the extracted 2D image features and 3D features stored in a sparse 3D model at 150.

Given the feature correspondences between the extracted 2D features and the 3D features in the maintained 3D model, a robust camera pose estimation technic, as indicated in 140, may estimate the camera position and orientation such that the number of consistent feature correspondences are maximized. This process may be done using a perspective-n-point (PnP) method or may be done using a non-linear optimization method optimizing the re-projection error.

Figure 2:
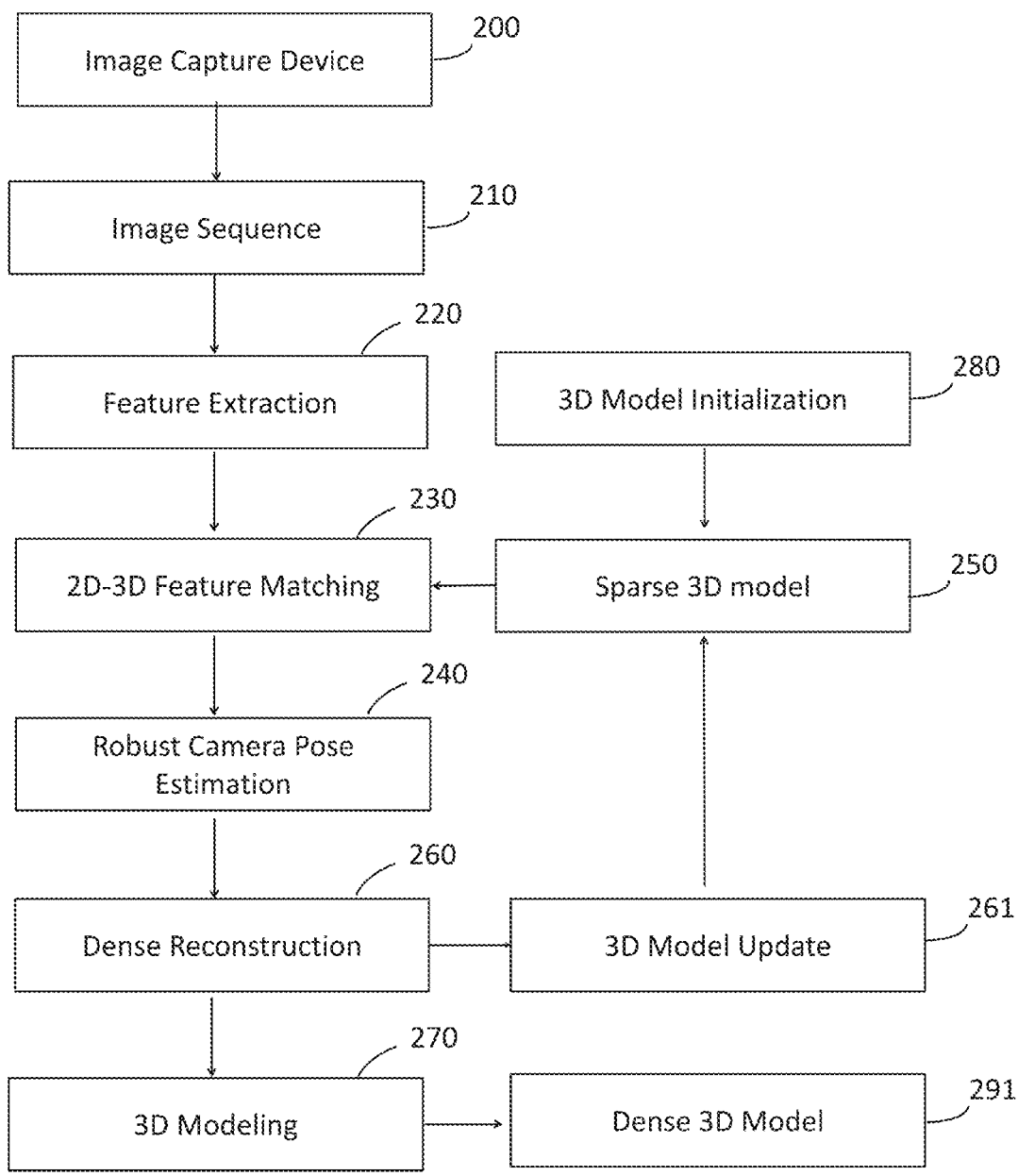
FIG. 2 is a flowchart illustrating an example of an online camera pose estimation and dense reconstruction algorithm.

FIG. 2 is a flowchart illustrating an example of an online camera pose estimation and dense reconstruction algorithm. As illustrated in FIG. 2, in at least some embodiments, a complete online camera pose estimation and dense reconstruction may be built. Steps 200 to 250 may be the same as steps 100 to 150 in FIG. 1. The initial sparse 3D model may be generated using a 3D model initialization technic as indicated at 280. This process may be achieved using a feature tracking and relative camera pose estimation method.

As indicated in 260, a dense reconstruction technic may be performed to infer dense geometric information from input images and update the sparse 3D model 250. The dense reconstruction process may be done by estimating depth maps using a multi-view stereo method. The dense reconstruction process may also be done using voxel-based methods or may be done using mesh-based methods.

As indicated in 270, a 3D modeling technic may be used to generate a dense 3D model. This process may be done using volumetric 3D modeling methods or using a point-based 3D modeling method.

Examples of how many of these steps may be performed are now presented.

Feature Extraction

As indicated at 120 in FIG. 1 and at 220 in FIG. 2, a feature extraction technic may be used to extract multiple 2D feature points from each input image from the video stream. 2D feature points may be extracted based on local texture information or may be extracted based on image gradient information.

Each 2D feature point may be associated with a 2D image coordinate and may be distinguishable from other feature points. In some embodiments, feature points such as scale-invariant feature transform (SIFT) features may be used which describes the imagery texture property around the 2D image coordinate.

2D-3D Feature Matching

As indicated at 130 in FIG. 1 and at 230 in FIG. 2, a 2D-3D feature matching technic may be performed. Examples of these are described below.

A sparse 3D model, as indicated at 150 in FIG. 1 and at 250 in FIG. 2, may be composed of feature points with their 3D positions. A 2D-3D feature matching technic may be performed to associate each extracted 2D image feature to the 3D features in the sparse 3D model that represents the "same" world location. This process may be done by measuring the similarity of descriptors between the 2D image features and 3D features in the 3D model.

In some embodiments, the sparse 3D model may be generated using an initialization technic, as indicated at 280 in FIG. 2. This process may be done using a 2D image feature tracking and relative camera pose estimation method. In some embodiments, the sparse 3D model may be generated using other technics and provided beforehand. This process may be done using active 3D scanner or may be using image-based scanning techniques.

Figure 3:
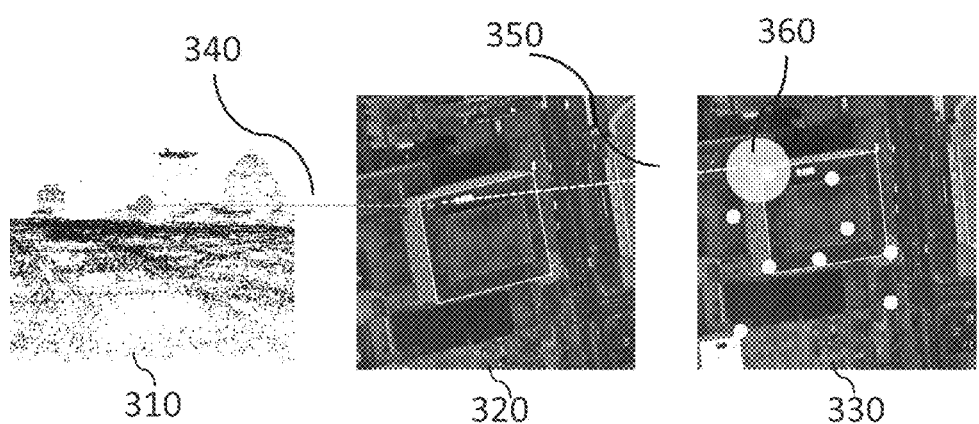
FIG. 3 illustrates an example of a three-step algorithm for 2D-3D feature matching between extracted 2D features and 3D feature points stored in a maintained 3D model.

FIG. 3 illustrates an example of a three-step algorithm for 2D-3D feature matching between extracted 2D features and 3D feature points stored in a maintained 3D model. As illustrated in FIG. 3, in some embodiments, a three-step strategy may be performed to find the association between the extracted 2D features in current frame, as indicated as 330, and the 3D features in the sparse 3D model, as indicated as 310.

Figure 4:
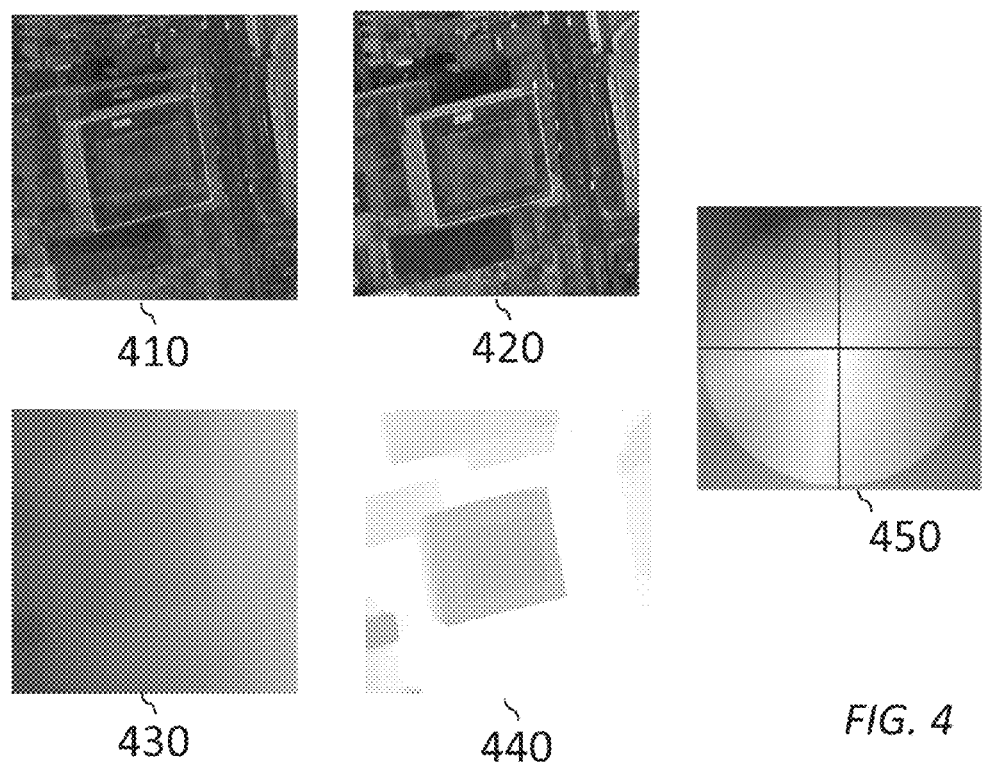
FIG. 4 illustrates examples of optical flow field computed between an original successive frame pair and optical flow field computed between a stabilized successive frame pair.

As indicated as 340, a perspective transformation may be performed on each 3D feature point stored in the maintained 3D model 319 to project it onto the previous frame, as indicated at 320:

$$x_i = K[R|T]X_i$$

where $x_i$ is the image coordinates of the projection of a 3D feature point $X_i$; K is the intrinsic camera parameter matrix; and R, T represents the rotation and translation matrix of the camera which fully describes the camera position and orientation of the previous frame. In some embodiments, the intrinsic camera parameter matrix K may be inferred using camera calibration tools. In some embodiments, the intrinsic camera parameter matrix K may be inferred using self-calibration algorithms. In some embodiments, occlusion may be handled as illustrated in FIG. 4.

As indicated as 350, dense optical flow between the previous frame 320 and the current frame 330 may be computed as described in next section. The projection of each 3D feature point on the current frame 330 can be evaluated by adding the displacement to its projection on the previous frame 320.

As indicated as 360, robust local searching may be performed in a small region around the evaluated projection on the current frame 320 to find the matched 2D image feature points. If multiple 2D image feature points are found, all of them may be dropped to avoid false matches with ambiguous features in regions with homogeneous texture. In some embodiments, a matched 2D image point may be found if the local texture similarity between the 2D and 3D feature points is larger than a threshold.

Optical Flow

FIG. 4 illustrates examples of optical flow field computed between an original successive frame pair and optical flow field computed between a stabilized successive frame pair. In the three-step 2D-3D feature matching technic, optical flow may be computed between successive frames, as illustrated in FIG. 4. A successive frame pair may be stacked for visual display, as indicated at 410 and 420. The resulting optical flow field may represent the 2-dimentional pixel displacement, as indicated at 430, 440 which may be color coded using the color map, as indicated as 450.

In some embodiments, a total-variation L1 (TVL1) method may be used to compute the dense optical flow. The flow displacement may be computed by minimizing an energy function:

$$E_u = \lambda \sum_\Omega |I_{n-1}(x) - I_n(x+u(x))|dx + \sum_\Omega |\nabla u|_1 dx$$

where u(x) is the optical flow field from the previous frame $I_{n-1}$ to the current frame; $I_n$. x represents the pixels in the image; and $\Omega$ represents the 2D image domain of $I_{n-1}$.

In some embodiments, a virtual ground plane may be identified and may help when computing accurate optical flow. The original frame pair, as indicated at 410, may be stabilized in terms of the ground plane using a RANSAC homgography method. Optical flow may be computed between the stabilized frame pair, as indicated at 420. Results show that the optical flow between stabilized frame pair, as indicated at 440, may be more accurate than the flow computed between original frame pair, as indicated at 430.

Occlusion Handling

When projecting 3D feature points in a sparse 3D model onto a previous frame, as indicated as 340, an occlusion problem may need to be handled such that only visible feature points can be projected. The visibility of a 3D feature point regarding a certain camera may be verified using its surface normal: the 3D feature point may not be visible if the angle between its surface normal and its viewing ray is larger than a threshold.

Robust Camera Pose Estimation

As indicated as 140 in FIGS. 1 and 240 in FIG. 2, a robust camera pose estimation technic may be performed to estimate the current camera position and orientation given the extracted 2D feature points in the current frame with the 3D positions of their associated 3D feature points.

Figure 5:
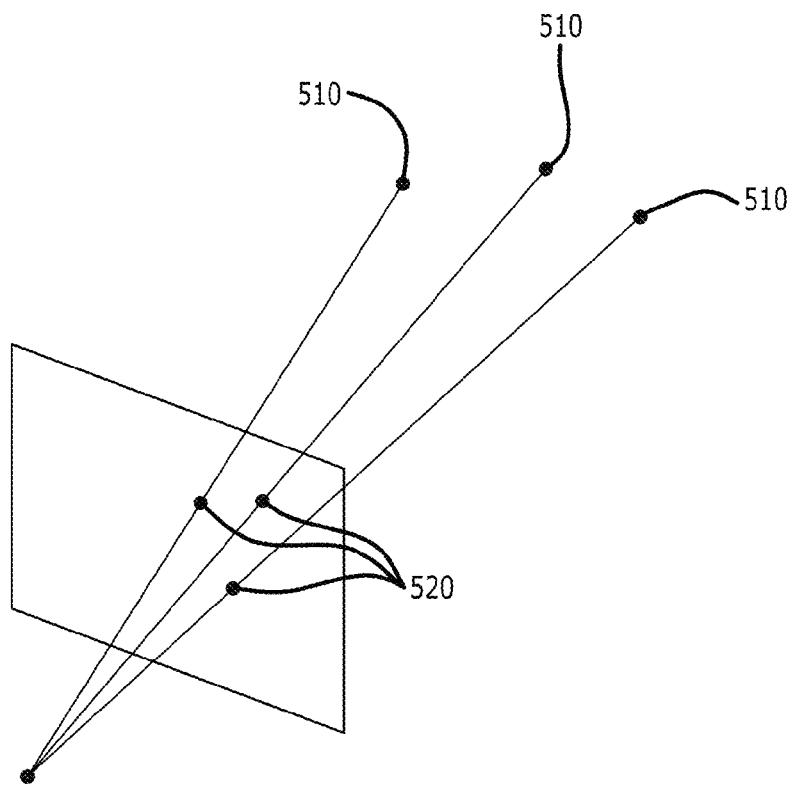
FIG. 5 illustrates an example of an estimation of a camera position and orientation given 2D image feature points and the 3D positions of their associated 3D feature points.

FIG. 5 illustrates an example of an estimation of a camera position and orientation given 2D image feature points and the 3D positions of their associated 3D feature points. A robust camera pose estimation technic is illustrated in FIG. 5 and described below.

The camera position and orientation may be fully described by a perspective transformation of the 3D points, as indicated at 510, to their 3D projections on the image, as indicated in 520. A camera pose estimation module may estimate the optimal camera position and orientation which may be achieved by minimizing the geometric error between the 2D feature points and the projections of their associated 3D points:

$$E_{R,T} = \sum_{i=1}^{N} \|x_i - K[R|T]X_i\|^2$$

where $x_i$ is the image coordinates of 2D image feature points; K is the intrinsic camera parameter matrix; $X_i$ is the 3D position of the 3D feature points associated with $x_i$; and R, T represents the rotation and translation matrix of camera which fully describes the camera position and orientation. In some embodiments, the intrinsic camera parameter matrix K may be inferred using camera calibration tools. In some embodiments, the intrinsic camera parameter matrix K may be inferred using self-calibration algorithms. In some embodiments, an RANSAC algorithm may be used to handle possible outliers.

Dense 3D Reconstruction

As indicated as 270 in FIG. 2, a dense 3D reconstruction technic may be performed to infer the dense 3D geometric information after obtaining the camera poses. The dense reconstruction process may be done by estimating depth maps using multi-view stereo methods. The dense reconstruction may also be done using voxel-based methods or may be done using mesh-based methods.

Figure 6A:
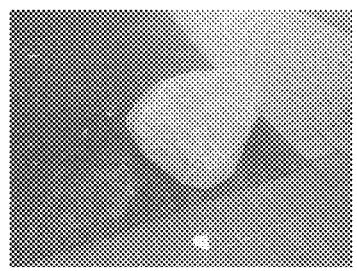
FIG. 6A illustrates an example of an input image.
Figure 6B:
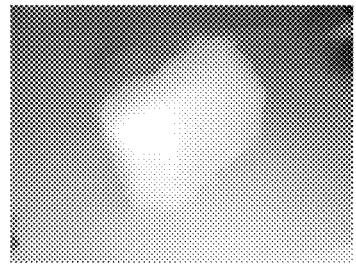
FIG. 6B illustrates an example of an estimated depth map of that input image.
Figure 6C:
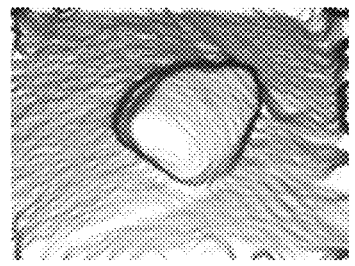
FIG. 6C illustrates an example of a confidence map for that input image.

FIG. 6A illustrates an example of an input image; FIG. 6B illustrates an example of an estimated depth map of that input image; and FIG. 6C illustrates an example of a confidence map for that input image. As illustrated in FIGS.

6A-6C, in some embodiments, a dense 3D reconstruction technic may infer the dense geometric information of the target scene through evaluating the photometric similarity between neighboring frames and estimating a dense depth map FIG. 6B for an input image FIG. 6A. In some embodiments, a confidence map may also be computed incorporating the surface normal information and photometric error as shown in FIG. 6C.

In some embodiments, dense 3D reconstruction may be performed through a variational method to estimate the depth map of an input image k by minimizing an energy function, including a data term measuring the average photometric similarity between N neighboring frames from N(k), and a smoothness regularization term:

$$E_H = \lambda \sum_\Omega C(x, D(x))dx + \sum_\Omega |\nabla D(x)|_1 dx$$

where D(x) represents the depth value at pixel x from the 2D image domain Ω. The data term C(x, D(x)) may measure the average intensity error across neighboring frames:

$$C(x, h) = \frac{1}{N} \sum_{i \in N(k)} |I_k(x) - I_i(\pi_i(\pi_k^{-1}(x, d)))|$$

where $\pi_k^{-1}$ (X, d) represents the operator to compute 3D point projected from pixel x on $I_k$ when assigned to depth d, and $\pi_i(\pi_k^{-1}$ (x, d)) is the operator to compute the pixel on $I_i$ back-projected from this 3D point.

In some embodiments, a virtual ground plane G may be identified and help computing the dense geometry. The varitional method may optimize over the altitude of each image pixel above the virtual ground plane, instead of depth value from the camera center:

$$E_H = \lambda \sum_\Omega C(x, H(x))dx + \sum_\Omega \|\nabla H(x)\|_\varepsilon dx$$

where H(x) represents the height of pixel x above the virtual ground plane G, and Ω is the 2D image domain of frame $I_k$. The data term may turn out to be:

$$C(x, h) = \frac{1}{N} \sum_{i \in N(k)} |I_k(x) - I_i(\pi_i(\pi_k^{-1}(x, h, G)))|$$

where $\pi_k^{-1}$(x, h, G) represents the operator to compute 3D point projected from pixel x on $I_k$ when assigned to height h above the ground plane G, and $\pi_i(\pi_k^{-1}$ (x, h, G)) is the operator to compute the pixel on $I_i$ back-projected from this 3D point.

Figure 7A:
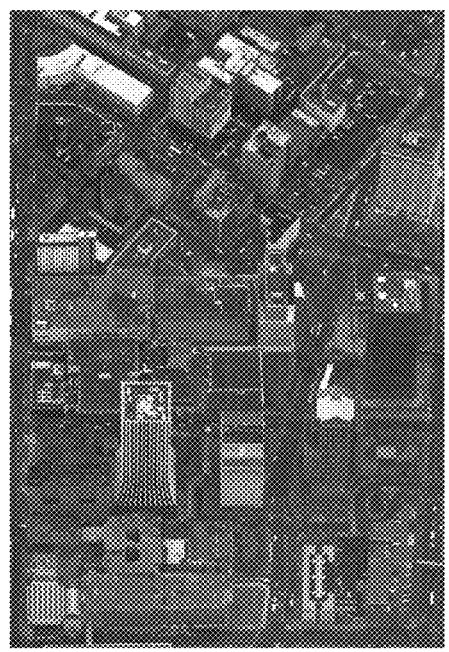
FIG. 7A illustrates an example of an input image and FIG. 7B illustrates an example of an estimated altitude map of that input image.
Figure 7B:
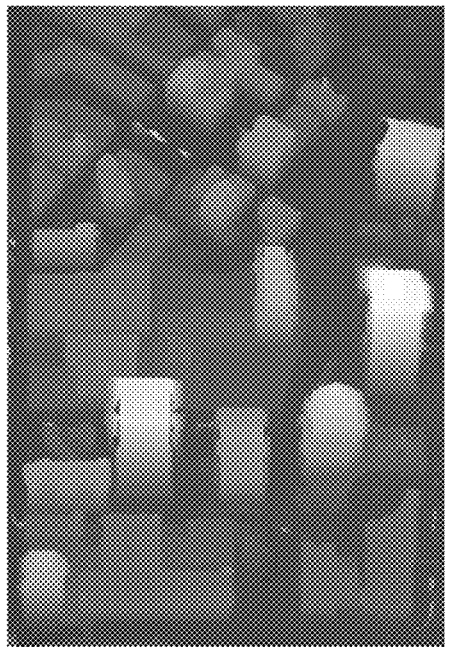

FIG. 7A illustrates an example of an input image and FIG. 7B illustrates an example of an estimated altitude map of that input image. Results show that the dense geometry may be more accurate and stable from estimated altitude map, as shown in FIGS. 7A-B.

3D Model Update

As indicated at 261 in FIG. 2, in some embodiments, a 3D model update technic may be performed to update the initial 3D model which may contain only a portion of the scene. This process may be done by adding the extracted feature points into the 3D model with their 3D positions estimated based on the inferred dense 3D geometric information.

In some embodiments, the 3D positions of extracted 2D feature points may be computed based on the dense geometric information generated from the dense 3D reconstruction technic as indicated at 260.

FIG. 8A illustrates an example of an incrementally updated 2.5D digital surface model, and FIG. 8B illustrates an example of occlusion handling based on this 2.5D digital surface model. In some embodiments, a virtual ground plane may exist and a dense 2.5D dense model may be maintained and incrementally updated, as illustrated in FIG. 8A. In this case, the occlusion status of a 3D position may be handled by checking the visibility information along the viewing ray between 3D position and the camera center, as shown in FIG. 8B.

Initialization

Figure 9:
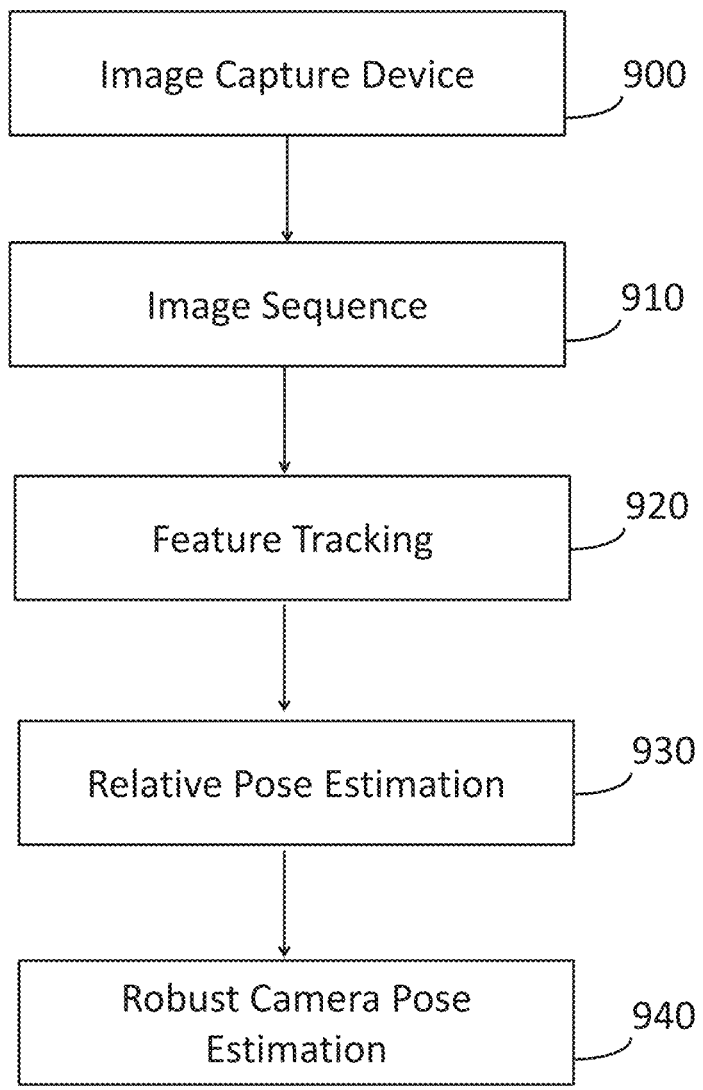
FIG. 9 is a flowchart illustrating an example of a 3D model initialization algorithm.

FIG. 9 is a flowchart illustrating an example of a 3D model initialization algorithm. As indicated at 280 in FIG. 2, in some embodiments, an initial 3D model may be generated from first several images through a 3D model initialization technic, as illustrated in FIG. 9 and described below.

As indicated at 920 in FIG. 9, in some embodiments, an initialization module may track the 2D image features points across the first several images. 2D image features from two or more than two images representing the "same" world position may be associated to produce feature point trajectories. Each feature point trajectory may be described as the 2D image coordinates in the input image sequence.

As indicated at 930 in FIG. 9, in some embodiments, a relative pose estimation method may be performed using the feature point trajectories between two selected key frames to estimate the relative rotation and translation between them. The relative rotation and translation may be estimated using the 5-point method. The feature point trajectories may be computed using Kanade-Lucas-Tomasi (KLT) feature tracker. The 3D positions of the tracked feature points may be computed through triangulation.

As indicated at 940 in FIG. 9, in some embodiments, the camera position and orientation of the frames between the two selected key frames may be estimated using the same robust camera pose estimation method, as indicated as 140 in FIGS. 1 and 240 in FIG. 2.

3D Modeling

As indicated at 270 in FIG. 2, a 3D modeling technic may be performed to produce a full 3D model from the dense geometric information obtained from dense reconstruction as indicated at 260. This process may be done using volumetric 3D modeling methods or using a point-based 3D modeling method.

In some embodiments, Poisson Surface Reconstruction (PSR) may be used to produce a full 3D polygon mesh model from the generated sparse 3D model. In some embodiments, volumetric reconstruction method may be used to produce a full 3D polygon mesh model by integrating depth maps from different views.

The 3D space may be split into a discrete grid of voxels, each of which may contain its signed distance to the surface. The signed distance of each voxel may be updated according to depth maps, as illustrated in FIG. 6B and confidence maps FIG. 6C using a Truncated Signed Distance Function (TSDF). In some embodiments, the signed distance of each voxel may be updated according to altitude maps, as illustrated in FIG. 7B. The polygon mesh model may be extracted as the level set at value 0, as illustrated in FIG. 10A.

Figure 10A:
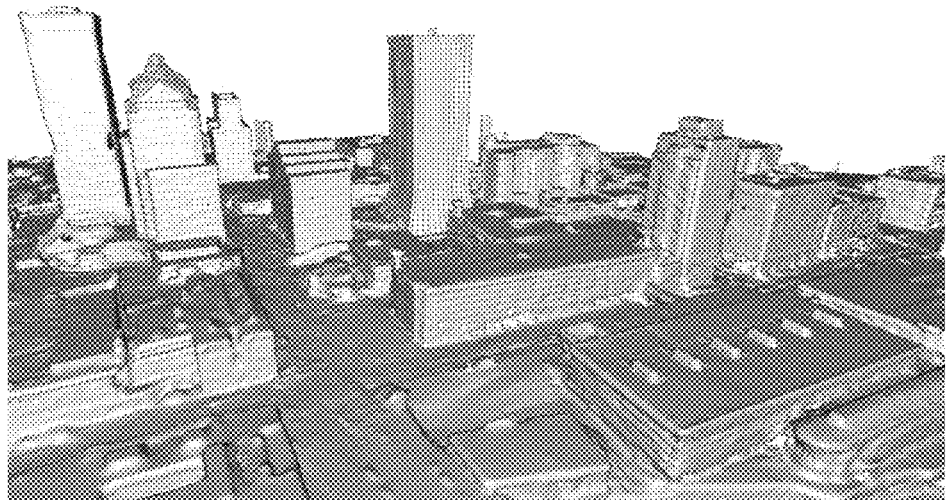
FIG. 10A illustrates an example of a reconstructed 3D polygonal mesh model.
Figure 10B:
FIG. 10B illustrates an example of a textured mesh model.

FIG. 10A illustrates an example of a reconstructed 3D polygonal mesh model, and FIG. 10B illustrates an example of a textured mesh model. In some embodiments, the texture information may be incorporated on the full 3D model for visual display, as indicated at FIG. 10B.

Unless otherwise indicated, the various algorithms and other data processing steps that have been described herein may be implemented by a product that may include a processing system containing a computing system with at least one processor and/or a non-transitory, tangible, computer-readable storage medium containing a program of instructions that causes a computer system running the program of instructions to implement the algorithms and data processing steps.

Each computer system includes one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

Other examples may be found in Zhuoliang Kang and Gerard Medioni, "*Fast Dense 3D Reconstruction using an Adaptive Multiscale Discrete-Continuous Variational method*", In WACV, 2014.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A product comprising a non-transitory, tangible, computer-readable storage medium containing a program of instructions that causes a computer system running the program of instructions to cause at least the following to occur:

receive a stream of video images of a scene, each image having been captured by an image capture device while located at a particular position and having a particular orientation, at least two of the images having been captured by the image capture device while at different locations;

after receiving each image and before processing the next image, generate information indicative of the position and orientation of the image capture device at the time of capturing the image and update a three dimensional (3D) model by performing at least the following:

identifying distinguishable image feature points in the image;

for each identified image feature point, attempting to identify one or more distinguishable model feature points in a three dimensional (3D) model of at least a portion of the scene that appears likely to correspond to the identified image feature point, where the correspondence is determined by a matching algorithm that performs at least the following:

back-projects the feature point in the three dimensional (3D) model onto the previously-received image;

finds an estimated pixel location on the current image using dense optical flow; and searches near the estimate pixel location to find the matched image feature point;

finding each of the following that, in combination, produce a consistent projection transformation of the 3D model onto the image:

a subset of identified image feature points for which one or more corresponding model feature points were identified; and for each image feature point that has multiple likely corresponding model feature points, one of the corresponding model feature points; and updating the three dimensional (3D) model by using the projection transformation of the current image to estimate geometry information.

2. The product of claim 1 wherein the product has a configuration that uses information from one or more inertial sensors to do the finding step.

3. The product of claim 1 wherein the product has a configuration that displays the updated 3D model after each update to the model.

4. The product of claim 1 wherein the product has a configuration that identifies a virtual ground plane of the scene and estimates an orientation of a normal to the virtual ground plane and a position of the virtual ground plane.

5. The product of claim 4 wherein the product has a configuration that produces a 2.5-dimensional digital surface model (DSM) and that includes information indicative of the altitude of components in the DSM above the virtual ground plane.

6. The product of claim 4 wherein the product has a configuration that rectifies images regarding the virtual ground plane to filter out parallax from camera motion and computes optical flow between rectified images.

7. The product of claim 1 wherein the product has a configuration that infers dense three dimensional (3D) geometric information about the scene based on at least a portion of the stream of video images and the information indicative of the position and orientation of the image capture device at the time of capturing at least two of the received video images.

8. The product of claim 7 wherein the product has a configuration that:

identifies a virtual ground plane of the scene and estimates an orientation of a normal to the virtual ground plane and a position of the virtual ground plane; and infers the dense 3D geometric information by estimating a height map of values that represent altitudes above the virtual ground plane.

9. The product of claim 7 wherein the product has a configuration that produces a dense 3D model of the scene based on the dense 3D geometric information.

10. The product of claim 9 wherein the product has a configuration that:

produces a 2.5-dimensional digital surface model (DSM) and that includes information indicative of the altitude of components in the DSM above the virtual ground plane; and produces a dense 3D polygon model based on the dense 3D geometric information using a volumetric reconstruction method with the volume size being based on the 2.5-dimensional digital surface model.

* * * * *